(12) United States Patent
Lescouet et al.

(10) Patent No.: US 7,434,224 B2
(45) Date of Patent: Oct. 7, 2008

(54) PLURAL OPERATING SYSTEMS HAVING INTERRUPTS FOR ALL OPERATING SYSTEMS PROCESSED BY THE HIGHEST PRIORITY OPERATING SYSTEM

(75) Inventors: Eric Lescouet, Paris (FR); Vladimir Grouzdev, Saint-Germain-en-Laye (FR)

(73) Assignee: Jaluna SA, Montigny-le-bretonneux (FR)

( * ) Notice: Subject to any disclaimer, the term of this patent is extended or adjusted under 35 U.S.C. 154(b) by 825 days.

(21) Appl. No.: 10/665,352

(22) Filed: Sep. 22, 2003

(65) Prior Publication Data
US 2004/0205755 A1 Oct. 14, 2004

(30) Foreign Application Priority Data
Apr. 9, 2003 (EP) .................................. 03290894

(51) Int. Cl.
*G06F 9/46* (2006.01)
*G06F 13/24* (2006.01)
*G06F 11/00* (2006.01)

(52) U.S. Cl. .................. 718/108; 710/260; 714/24; 714/38; 719/319

(58) Field of Classification Search ......... 718/100–108; 709/329; 710/260; 714/24, 38; 719/319
See application file for complete search history.

(56) References Cited

U.S. PATENT DOCUMENTS

| | | | |
|---|---|---|---|
| 5,144,692 A * | 9/1992 | Baker et al. .................. 710/240 |
| 5,721,922 A | 2/1998 | Dingwall et al. |
| 5,903,752 A | 5/1999 | Dingwall et al. |
| 5,995,745 A | 11/1999 | Yodaiken |
| 6,199,096 B1 * | 3/2001 | Mirashrafi et al. ........... 709/202 |
| 6,269,409 B1 * | 7/2001 | Solomon .................... 719/329 |
| 6,606,742 B1 * | 8/2003 | Orton et al. ................. 717/140 |
| 6,615,303 B1 * | 9/2003 | Endo et al. .................. 710/260 |
| 6,684,261 B1 * | 1/2004 | Orton et al. ................. 719/328 |
| 6,715,016 B1 * | 3/2004 | Ohno et al. ................. 710/260 |
| 6,868,507 B1 * | 3/2005 | Gurumoorthy et al. ........ 714/25 |
| 6,920,633 B1 * | 7/2005 | Venkatraman et al. ...... 718/104 |
| 7,356,677 B1 * | 4/2008 | Rafizadeh ...................... 713/1 |

(Continued)

FOREIGN PATENT DOCUMENTS

| | | | |
|---|---|---|---|
| EP | 1054322 A2 | 11/2000 |
| EP | 1162536 A1 | 12/2001 |

OTHER PUBLICATIONS

Jaluna-2 Preview Release 1 Description, Jaluna Product Documentation, Dec. 2002, pp. 1-32, XP0001189063.

*Primary Examiner*—Meng-Ai An
*Assistant Examiner*—Jennifer N To
(74) *Attorney, Agent, or Firm*—Nixon & Vanderhye PC

(57) ABSTRACT

Multiple different operating systems are enabled to run concurrently on the same computer. A first operating system is selected to have a relatively high priority (the realtime operating system, such as C5). At least one secondary operating system is selected to have a relatively lower priority (the general purpose operating system, such as Linux). A common program (a hardware resource dispatcher similar to a nanokernel) is arranged to switch between these operating systems under predetermined conditions and modifications are provided to the first and second operating systems to allow them to be controlled by the common program.

31 Claims, 9 Drawing Sheets

U.S. PATENT DOCUMENTS

2001/0016879 A1     8/2001   Sekiguchi et al.
2002/0078339 A1 *   6/2002   Hung-Ju et al. ................ 713/2
2003/0036843 A1     2/2003   Okude et al.
2003/0204780 A1 *   10/2003  Dawkins et al. ............... 714/24

* cited by examiner

PLURAL OPERATING SYSTEMS HAVING INTERRUPTS FOR ALL OPERATING SYSTEMS PROCESSED BY THE HIGHEST PRIORITY OPERATING SYSTEM

BACKGROUND

1. Technical Field

This invention relates to operating systems. More particularly, this invention relates to systems, methods and computer programs for running multiple operating systems concurrently.

2. Related Art

Applications programs interact with the computers on which they run through operating systems. By using the applications programming interface (API) of the operating system, the applications program can be written in a portable fashion, so that it can execute on different computers with different hardware resources. Additionally, common operating systems such as Linux or Windows provide multi-tasking; in other words, they allow several programs to operate concurrently. To do so, they provide scheduling; in other words, they share the usage of the resources of the computer between the different programs, allocating time to each in accordance with a scheduling algorithm. Operating systems of this kind are very widely used, but they generally make no provision for running real time applications, and they therefore are unsuitable for many control or communications tasks.

For such tasks, therefore, real time operating systems have been developed; one example is ChorusOS (also know as Chorus) and its derivatives.

It is described in "ChorusOS Features and Architecture overview" Francois Armand, Sun Technical Report, August 2001, 222p, available from Jaluna.

For some computer programs, it is critical that steps in the program are performed within defined time periods, or at defined times. Examples of such programs are control programs for operating mobile telephones, or for operating private branch exchanges (PBXs) or cellular base stations. Typically, the program must respond to external events or changes of state in a consistent way, at or within a certain time after the event. This is referred to as operating in "real time".

For many other programs, however, the time taken to execute the program is not critical. This applies to most common computer programs, including spreadsheet program, word processing programs, pay roll packages, and general reporting or analysis programs. On the other hand, whilst the exact time taken by such programs is not critical, in most cases, users would prefer quicker execution where this is possible.

Applications programs interact with the computers on which they run through operating systems. By using the applications programming interface (API) of the operating system, the applications program can be written in a portable fashion, so that it can execute on different computers with different hardware resources. Additionally, common operating systems such as Linux or Windows provide multi-tasking; in other words, they allow several program to operate concurrently. To do so, they provide scheduling; in other words, they share the usage of the resources of the computer between the different programs, allocating time to each in accordance with a scheduling algorithm. Operating systems of the this kind are very widely used, but they generally make no provision for running real time applications, and they therefore are unsuitable for many control or communications tasks.

For such tasks, therefore, real time operating systems have been developed; one example is ChorusOS (also know as Chorus) and its derivatives. Chorus is available as open source software from:

experimentalstuff.com/Technologies/ChorusOS/index and Jaluna at jaluna.com/

It is described in "ChorusOS Features and Architecture overview" Francois Armand, Sun Technical Report, August 2001, 222p, available from:

jaluna.com/developer/papers/COSDESPERF.

These operating systems could also be used to run other types of programs. However, users understandably wish to be able to run the vast number of "legacy" programs which are written for general purpose operating systems such as Windows or Linux, without having to rewrite them to run on a real time operating system.

In U.S. Pat. Nos. 5,903,752 and 5,721,922, an attempt is made to incorporate a real time environment into a non real time operating system by providing a real time multi-tasking kernel in the interrupt handling environment of the non real time operating system (such as Windows).

It would be possible to provide a "dual boot" system, allowing the user to run either one operating system or the other, but there are many cases where it would be desirable to be able to run a "legacy" program at the same time as running a real time program. For example, telecommunications network infrastructure equipment, third generation mobile phones and other advanced phones, and advanced electronic gaming equipment may require both realtime applications (e.g. game playing graphics) and non-realtime applications (game download).

One approach which has been widely used is "emulation". Typically, an emulator program is written, to run under the real time operating system, which interprets each instruction of a program written for a general purpose operating system, and performs a corresponding series of instructions under the real time operating system. However, since one instruction is always replaced by many, emulation places a heavier load on the computer, and results in slower performance. Similar problems arise from the approach based on providing a virtual machine (e.g. a Java™ virtual machine).

A further similar technique is described in U.S. Pat. No. 5,995,745 (Yodaiken). Yodaiken describes a system in which a multi tasking real time operating system runs a general purpose operating system as one of its tasks, pre-empting it as necessary to perform real time tasks.

A more similar approach is that of ADEOS (Adaptive Domain Environment for Operating Systems), described in a White Paper at opersys.com/ftp/pub/Adeos/adeos ADEOS provides a nanokernel which is intended, amongst other things, for running multiple operating systems although it appears only to have been implemented with Linux. One proposed use of ADEOS was to allow ADEOS to distribute interrupts to RTAI (Realtime Application Interface for Linux) for which see:

aero.polimi.it/.about.rtai/applications/

BRIEF SUMMARY

An object of the present invention is to provide an improved system, method and computer program for running multiple operating systems simultaneously, even when the systems are designed for different purposes. In particular, the present invention aims to allow one of the operating systems (for example, a real time operating systems) to perform without disturbance, and the other (for example, a general purpose operating system) to perform as well as possible using the remaining resources of the computer.

Accordingly, in one aspect, the present invention provides a system in which multiple operating systems are slightly modified and provided with a common program which schedules between them, in which one of the operating systems (the "primary" or "critical" operating system) is favoured over another (the "secondary" or non-critical operating system). Preferably, the invention allocates hardware preferentially to the critical operating system, and it denies the secondary operating system or systems access which would interfere with that of the critical operating system. Preferably, the present invention uses the critical operating system drivers to access shared resources, even if the access is requested by the secondary operating system. However, in no sense is the critical operating system "running" the secondary operating system, as in U.S. Pat. No. 5,995,745; each system ignores the others running alongside it and only communicates with the common program (corresponding to a nanokernel of the prior art) which brokers the access to the drivers of the critical operating system.

Other aspects, embodiments and preferred features, with corresponding advantages, will be apparent from the following description, claims and drawings.

BRIEF DESCRIPTION OF THE DRAWINGS

Embodiments of the invention will now be described, by way of example only, with reference to the accompanying drawings, in which.

DETAILED DESCRIPTION OF EXEMPLARY EMBODIMENTS

Introduction

System Hardware

Figure 1:
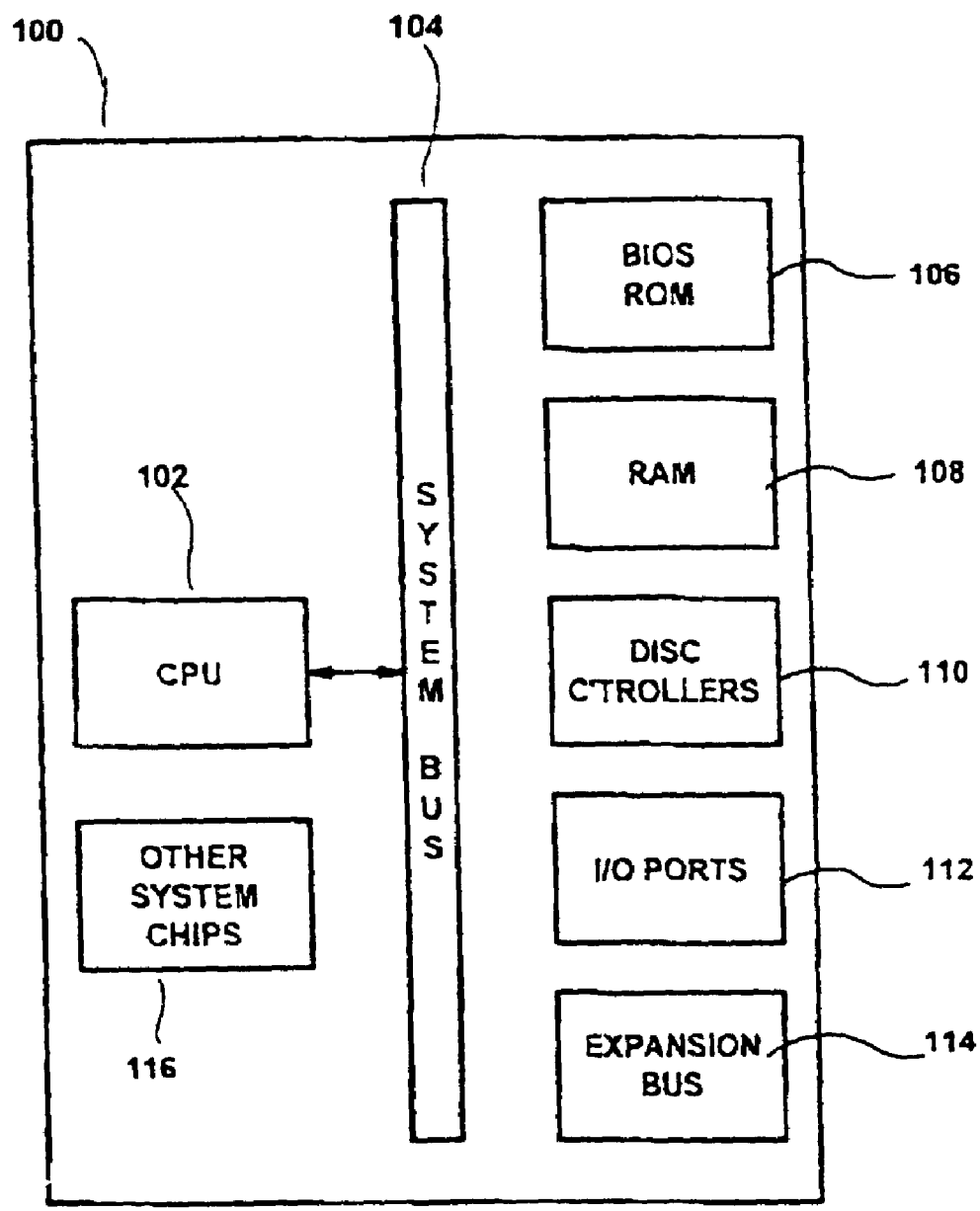
FIG. 1 is a block diagram showing the elements of a computer system on which the present invention can execute.

A computer system to which the system is applicable 100 comprises a central processing unit (CPU) 102, such as a Pentium 4™ CPU available from Intel Corporation, or PowerPC CPU available from Motorola (the embodiment has been implemented on both), coupled via a system bus 104 (comprising control, data and address buses) to a read-only memory (ROM) chip 106; one or more banks of random access memory (RAM) chips (108); disk controller devices 110 (for example Integrated Drive Electronics (IDS) or Small Computer System Interface (SCSI) controllers, connected to a floppy disk drive, a hard disk drive, and additional removable media drives such as Digital Video Disk (DVD) drives); one or more input/output ports (112) (for example, one or more Universal Serial Bus (USB) port controllers, and/or parallel port controllers for connection to printer and so on); an expansion bus 14 for bus connection to external or internal peripheral devices (for example the Peripheral component Interconnect (PCI) bus); and other system chips 116 (for example, graphics and sound devices). Examples of computers of this type are personal computers (PCs) and workstations. However, the application of the invention to other computing devices such as mainframes, embedded microcomputers in control systems, and Personal Digital Assistants (PDAs) (in which case some of the indicated devices such as disk drive controllers may be absent) is also disclosed herein.

Management of Software

Figure 2A:
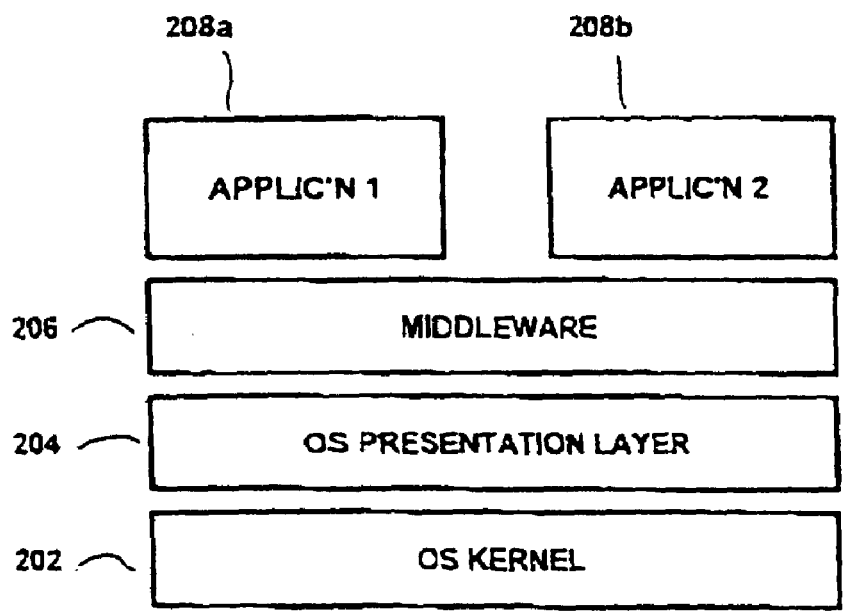
FIG. 2a is a diagram illustrating the arrangement of software in the prior art.

Referring to FIG. 2a, in use, the computer 100 of FIG. 1 runs resident programs comprising operating system kernel 202 (which provides the output routines allowing access by the CPU to the other devices shown in FIG. 1); an operating system user interface or presentation layer 204 (such as X Windows); a middleware layer 206 (providing networking software and protocols such as, for instance, a TCP/IP stack) and applications 208a, 208b, which run by making calls to the API routines forming the operating system kernel 202.

The operating system kernel has a number of tasks, in particular:
scheduling (i.e., sharing the CPU and associated resources between different applications which are running);
memory management (i.e. allocating memory to each task, and, where necessary, swapping data and programs out of memory add on to disk drives);
providing a file system;
providing access to devices (typically, through drivers);
interrupt handling;
providing an applications programming interface enabling the applications to interact with system resources and users.

The kernel may be a so-called "monolithic kernel" as for Unix, in which case the device drivers form part of the kernel itself. Alternatively, it may be a "microkernel" as for Chorus, in which case the device drivers are separate of the kernel.

In use, then, when the computer 100 is started, a bootstrap program stored in Read Only Memory (ROM) 106 accesses the disk controllers 110 to read the file handling part of the operating system from permanent storage on disk into Random Access Memory (RAM) 108, then loads the remainder of the operating system into an area of RAM 108. The operating system then reads any applications from the disk drives via the disk controllers 110, allocates space in RAM 108 for each, and stores each application in its allocated memory space.

During operation of the applications, the scheduler part of the operating system divides the use of the CPU between the different applications, allowing each a share of the time on the processor according to a scheduling policy. It also manages use of the memory resources, by "swapping out" infrequently used applications or data (i.e. removing them from RAM 108 to free up space, and storing them on disk).

Finally the routines making up the applications programming interface (API) are called from the applications, to execute functions such as input and output, and the interrupt handling routines of the operating system respond to interrupt and events.

SUMMARY OF PRINCIPLES OF THE PREFERRED EMBODIMENT

In the preferred embodiment, each operating system 201, 202 to be used on the computer 100 is slightly re-written, and a new low-level program 400 (termed here the "hardware resource dispatcher", and sometimes known as a "nanokernel" although it is not the kernel of an operating system) is created. The hardware resource dispatcher 400 is specific to the particular type of CPU 102, since it interacts with the processor. The versions of the operating systems which are modified 201, 202 are also those which are specific to the hardware, for reasons which will become apparent.

The hardware resource dispatcher 400 is not itself an operating system. It does not interact with the applications programs at all, and has very limited functionality. Nor is it a virtual machine or emulator; it requires the operating systems to be modified in order to cooperate, even though it leaves most of the processing to the operating systems themselves, running their native code on the processor.

It performs the following basic functions:
loading and starting each of the multiple operating systems;
allocating memory and other system resources to each of the operating systems;
scheduling the operation of the different operating systems (i.e. dividing CPU time between them, and managing the change over between them);
providing a "virtualised device" method of indirect access to those system devices which need to be shared by the operating systems ("virtualising" the devices);
providing a communications link between the operating systems, to allow applications running on different operating systems to communicate with each other.

The operating systems are not treated equally by the embodiment. Instead, one of the operating systems is selected as the "critical" operating systems (this will be the real time operating system), and the or each other operating system is treated as a "non critical" or "secondary" operating systems (this will be the or each general purpose operating system such as Linux).

When the hardware resource dispatcher is designed, it is provided with a data structure (e.g. a table) listing the available system resources (i.e. devices and memory), to enable as many system devices as possible to be statically allocated exclusively to one or other of the operating systems.

For example, a parallel printer port might be statically allocated to the general purpose operating system 202, which will often run applications which will need to produce printer output. On the other hand, an ISDN digital line adapter port may be permanently allocated to the real time operating system 201 for communications. This static allocation of devices wherever possible means that each operating system can use its existing drivers to access statically allocated devices without needing to call the hardware resource dispatcher. Thus, there is no loss in execution speed in accessing such devices (as there would be if it acted as a virtual machine or emulator).

In the case of system devices which must be shared, the hardware resource dispatcher virtualises uses of the devices by the non-critical operating systems, and makes use of the drivers supplied with the critical operating system to perform the access. Likewise, for interrupt handling, the interrupts pass to the critical operating system interrupt handling routines, which either deal with the interrupt (if it was intended for the critical operating system) or pass it back through the hardware resource dispatcher for forwarding to a non critical operating system (if that was where it was destined).

On boot, the hardware resource dispatcher is first loaded, and it then loads each of the operating systems in a predetermined sequence, starting with the critical operating system, then following with the or each secondary operating system in turn. The critical operating system is allocated the resources it requires from the table, and has a fixed memory space to operate in. Then each secondary operating system in turn is allocated the resources and memory space it requires from the available remaining resources.

Thus, according to the embodiment, the resources used by the operating systems are separated as much as physically possible, by allocating each its own memory space, and by providing a static allocation of devices exclusively to the operating systems; only devices for which sharing is essential are shared.

In operation, the hardware resource dispatcher scheduler allows the critical operating system to operate until it has concluded its tasks, and then passes control back to each non critical operating system in turn, until the next interrupt or event occurs.

The embodiment thus allows a multi operating system environment in which the operation of the critical operating system is virtually unchanged (since it uses its original drivers, and has first access to any interrupt and event handling). The secondary operating systems are able to operate efficiently, within the remaining processor time, since in most cases they will be using their own native drivers, and will have exclusive access to many of the system devices. Finally, the hardware resource dispatcher itself can be a small program, since it handles only limited functions, so that system resources are conserved.

The preferred embodiment is also economic to create and maintain, because it involves only limited changes to standard commercial operating systems which will already have been adapted to the particular computer 100. Further, since the changes to the operating systems are confined to architecture specific files handling matters such as interrupt handling, and configuration at initialising time, which interface with the particular type of computer 100, and which are unlikely to change as frequently as the rest of the operating system, there may be little or no work to do in adapting new versions of the same operating system to work in a multiple operating system fashion.

DETAILED DESCRIPTION OF THE PREFERRED EMBODIMENT

In this embodiment, the computer 100 was an Intel 386 family processor (e.g. a Pentium processor) and a Motorola PowerPC 750 (Reduced Instruction Set Computer or "RISC") computer (step 302). The critical operating system 201 was the C5 operating system (the real time microkernel of Jaluna-1, an open-source version of the fifth generation of the ChorusOS system, available for open source, free download from jaluna.com).

In step 306, the ChorusOS operating system kernel 201 is modified for operating in multiple operating system mode, which is treated in the same way s porting to a new platform (i.e. writing a new Board Support Package to allow execution on a new computer with the same CPU but different system devices). The booting and initialisation sequences are modified to allow the real time operating system to be started by the hardware resource dispatcher, in its allocated memory space, rather than starting itself. The hardware-probing stage of the initialisation sequence is modified, to prevent the critical operating system from accessing the hardware resources which are assigned to other secondary systems. It reads the static hardware allocation table from the hardware resource dispatcher to detect the devices available to it.

Trap calls are added to the critical operating system, to detect states and request some actions in response. A trap call here means a call which causes the processor to save the current context (e.g. state of registers) and load a new context. Thus, where virtual memory addressing is used, the address pointers are changed.

For example, when the real time operating system 201 reaches an end point (and ceases to require processor resources) control can be passed back to the hardware resource dispatcher, issuing the "idle" trap call, to start the secondary operating system. Many processors have a "halt" instruction. In some cases, only supervisor-level code (e.g. operating systems, not applications) can include such a "halt" instruction. In this embodiment, all the operating systems are rewritten to remove "halt" instructions and replace them with an "idle" routine (e.g. an execution thread) which, when called, issues the "idle" trap call.

Some drivers of the Board Support Package are specially adapted to assist the hardware resource dispatcher in virtualizing the shared devices for secondary operating systems.

Additional "virtual" drivers are added which, to the operating system, appear to provide access to an input/output (I/O) bus, allowing data to be written to the bus. In fact, the virtual bus driver uses memory as a communications medium; it exports some private memory (for input data) and imports memory exported by other systems (for output data). In this way, the operating system 201 (or an application running on the operating system) can pass data to another operating system (or application running on it) as if they were two operating systems running on separate machines connected by a real I/O bus.

The secondary operating system 202 was selected (step 308) as Linux, having a kernel version 2.4.18 (step 308).

In step 310, the secondary operating system kernel 202 is modified to allow it to function in a multiple operating system environment, which is treated as a new hardware architecture. As in step 306, the boot and initialization sequences are modified, to allow the secondary operating system to be started by the hardware resource dispatcher, and to prevent it from accessing the hardware resources assigned to the other systems, as specified in the hardware resource dispatcher table. As in step 306, trap call are added, to pass control to the hardware resource dispatcher.

Native drivers for shared system devices are replaced by new drivers dealing with devices which have been virtualized by the hardware resource dispatcher (interrupt controller, I/O bus bridges, the system timer and the real time clock). These drivers execute a call to virtual device handlers 416 of the hardware resource dispatcher in order to perform some operations on a respective device of the computer 100. Each such virtual device handler 416 of the hardware resource dispatcher is paired with a "peer" driver routine in the critical operating system, which is arranged to directly interact with the system device. Thus, a call to a virtual device handler is relayed up to a peer driver in the critical system for that virtualized device, in order to make real device access. As in step 306, read and write drivers for the virtual I/O bus are provided, to allow inter-operating system communications.

The interrupt service routines of the secondary operating system are modified, to provide virtual interrupt service routines each of which responds to a respective virtual interrupt (in the form of a call issued by an interrupt handler routine 412 of the hardware resource dispatcher), and not to respond to real interrupts or events. Routines of the secondary operating system (including interrupt service routines) are also modified to remove masking of hardware interrupts (at least in all except critical operations). In that way, the secondary operating systems 202, . . . are therefore pre-emptable by the critical operating system 201; in other words, the secondary operating system response to a virtual interrupt can itself be interrupted by a real interrupt for the critical operating system 201. This typically includes:

masking/unmasking events (interrupts at processor level);
  saving/restoring events mask status;
  identifying the interrupt source (interrupt controller devices);
  masking/unmasking interrupts at source level (interrupt controller devices).

New virtual device drivers 2028 are added, for accessing the shared hardware devices (the I/O bus bridges, the system console, the system timer and the real time clock). These drivers execute a call to virtual device handlers 416 of the hardware resource dispatcher in order to write data to, or read data from, a respective device of the computer 100.

To effect this, the Linux kernel 202 is modified in this embodiment by adding new virtual hardware resource dispatcher architecture sub trees (nk-i386 and nk-ppc for the I-386 and Power PC variants) with a small number of modified files. Unchanged files are reused in their existing form. The original sub-trees are retained, but not used.

Figure 4:
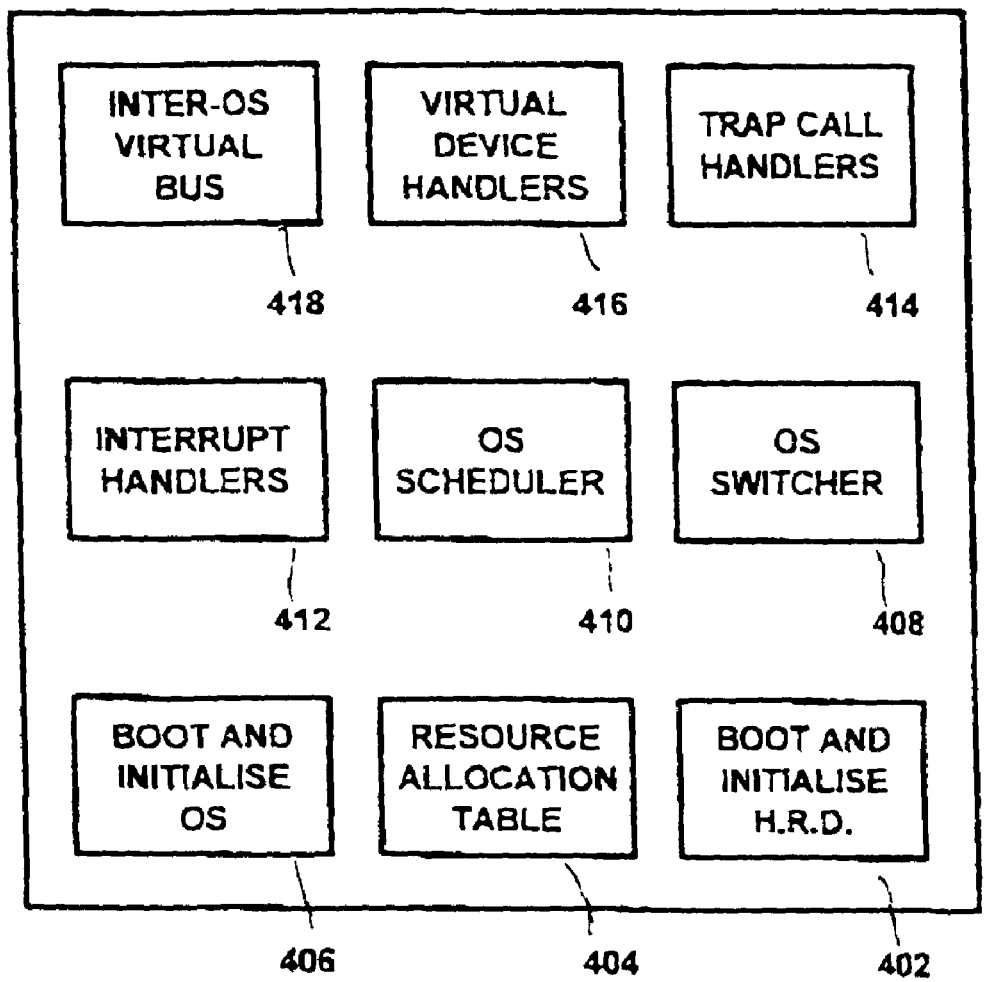
FIG. 4 show the components of a hardware resource dispatcher forming part of FIG. 2b.

In step 312, the hardware resource dispatcher 400 is written. The hardware resource dispatcher comprises code which provides routines for the following functions as (as shown in FIG. 4):

booting and initializing itself (402);
  storing a table which stores a list of hardware resources (devices such as ports) and an allocation entry indicating to which operating system each resource is uniquely assigned;
  booting and initializing the critical operating system that completes the hardware resource dispatcher allocation tables (404);
  booting and initializing secondary operating systems (406)
  switching between operating systems (408);
  scheduling between operating systems (410);
  handling interrupts (using the real time operating system interrupt service routines, and supplying data where necessary to the virtual interrupt service routines of the secondary operating systems) (412);
  handling trap calls from each of the operating systems (414);
  handling access to shared devices from the secondary operating systems (416);
  handling inter-operating system communications on the virtual I/O bus (418).

In further embodiments (described below), it may also provide a system debugging framework.

Operating System Switcher 408

In order to switch from an operating system to another, the operating system switcher 408 is arranged to save the "context"—the current values of the set of state variables, such as register values—of the currently executing operating system; restore the stored context of another operating system; and call that other operating system to recommence execution where it left off. Where the processor uses segments of memory, and virtual or indirect addressing techniques, the registers or data structures storing the pointers to the current memory spaces are thus swapped. For example, the operating systems each operate in different such memory spaces, defined by the context including the pointer values to those spaces.

In detail, the switcher provides:
explicit switches (e.g. trap calls) from the currently running to the next scheduled operating systems, when the current becomes idle; and
implicit switches from a secondary operating system to the critical operating system, when a hardware interrupt occurs.

The switches may occur on a trap call or a real or virtual interrupt, as described below.

Scheduler 410

The scheduler 410 allocates each operating system some of the available processing time, by selecting which secondary operating system (if more than one is present) will be switched to next, after exiting another operating system. In this embodiment, each is selected based on fixed priority scheduling. Other embodiments allowing specification based on time sharing, or guaranteed minimum percentage of processor time, are also contemplated herein. In each case, however, the critical operating system is pre-empted only when in the idle state.

In further embodiments, the critical operating system may explicitly inform the scheduler 410 when it may be pre-empted, so as to allow all secondary operating systems some access to the CPU to perform tasks with higher priority then the tasks still running in critical system. Thus, in one example, the interrupt service routines of the critical operating system cannot be pre-empted, so that the critical operating system can always respond to external events or timing signals from the realtime clock, maintaining realtime operation.

Handling Virtualised Processor Exceptions

The hardware resource dispatcher is arranged to provide mechanisms to handle processor exceptions (e.g. CPU interrupts or co-processor interrupts) as follows:
firstly, to intercept processor exceptions through the critical operating system;
secondly, to post a corresponding virtual exception to one or more secondary operating systems; to store that data and, when the scheduler next calls that secondary operating system, to call the corresponding virtual interrupt service routine 2026 in the secondary operating system;
thirdly, to mask or unmask any pending virtual exceptions from within secondary operating systems.

Virtualised exceptions are typically used for two different purposes;
Firstly, to forward hardware device interrupts (which are delivered as asynchronous processor exceptions) to secondary operating systems;
Secondly, to implement inter-operating system cross-interrupts—i.e. interrupts generated by one system for another interrupts (which are delivered as synchronous exceptions).

Trap Call Handler 414

The operation of the trap call handler will become apparent from the following description. Its primary purpose is to allow the scheduler and switcher to change to another operating system when a first one halts (and hence does not require CPU resources). An additional role is to invoke hardware resource dispatcher services such as a system console for use in debugging as discussed in relation to later embodiments.

Virtualised Devices 416

As indicated above, for each shared device (e.g. interrupt controller, bus bridges, system timer, realtime clock) each operating system provides a device driver, forming a set of peer-level drivers for that device. The realtime operating system provides the driver used to actually access the device, and the others provide virtual device drivers.

The shared device handler 416 of the hardware resource dispatcher provides a stored data structure for each device, for access by all peer device drivers of that device. When the device is to be accessed, or has been accessed, the device drivers update the data stored in the corresponding data structure with the details of the access. The peer drivers use cross-interrupts (as discussed above) to signal an event to notify other peer drivers that that the data structure has just been updated.

The drivers which are for accessing interrupt controller devices use the virtualised exception mechanisms discussed above to handle hardware interrupts as follows:
The critical operating system device driver handles hardware interrupts and forwards them as virtualised exceptions to the secondary peer drivers;
The secondary operating system enables and disables interrupts by using the virtualised exception masking and unmasking routines discussed above.

I/O buses and their bridges only have to be shared if the devices connected to them are not all allocated to the same operating system. Thus, in allocating devices, to the extent possible, devices connected to the same I/O bus are allocated to the same operating system. Where sharing is necessary, the resource allocation table 404 stores descriptor data indicating the allocation of the resources on the bus (address spaces, interrupt lines and I/O ports) to indicate which operating system has which resources.

Implementation of the Embodiment

Finally, in step 314, the code for the hardware resource dispatcher and operating systems is compiled as a distributable binary computer program product for supply with the computer 100.

A product which may be supplied in accordance with an aspect of the invention is a development environment product, comprising a computer program which enables the user to select different operating systems to be used, build and select different applications for each operating system, embed the application and operating systems into a deliverable product, and provide for booting of the operating system and launch of executable binaries of the applications. This is based on, and similar to, the C5 development environment, available from Jaluna.

Operation of the Embodiment During Booting and Initialisation

Figure 5:
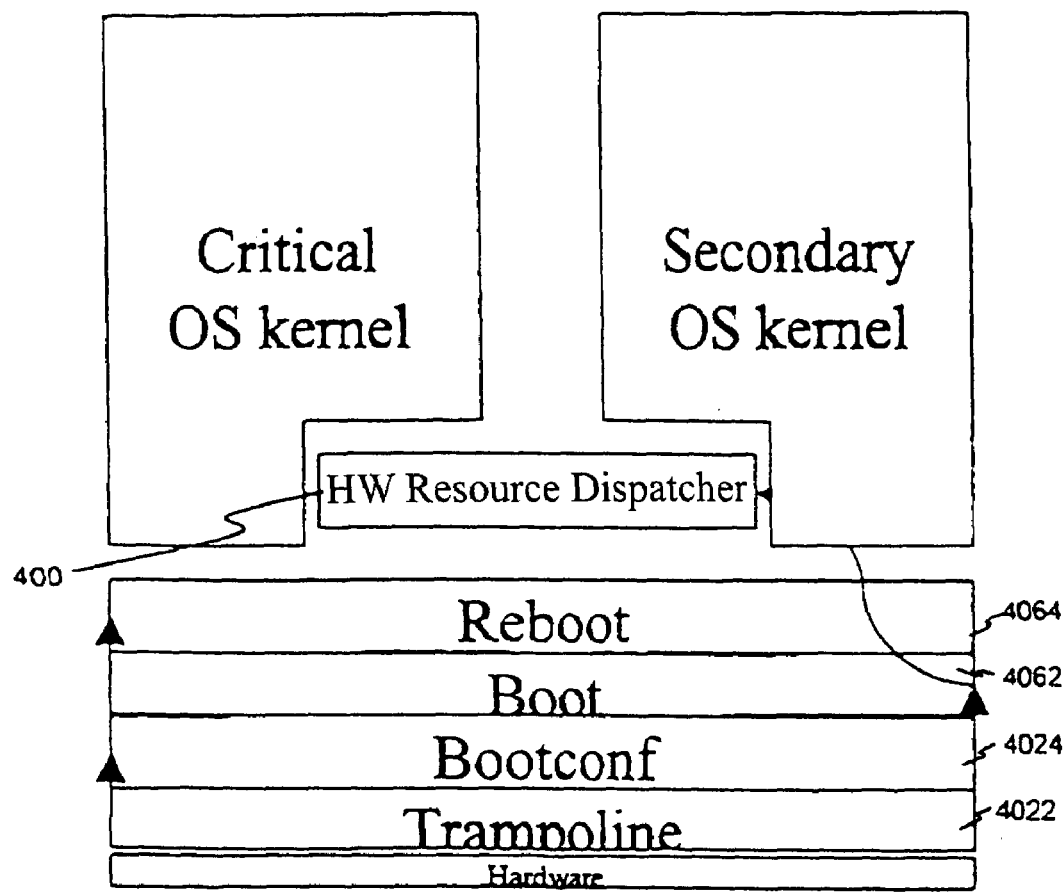
FIG. 5 illustrates the program used in a boot and initialisation sequence.

Referring to FIG. 5, the boot and initialisation processes according to this embodiment are performed as follows.

A bootstrapping program ("trampoline") 4022 stored in the ROM 106 is executed when power is first supplied, which starts a program 4024 which installs the rest of the hardware resource dispatcher program 400 into memory, and starts it, passing as an argument a data structure (as described below) describing the system image configuration.

The hardware resource dispatcher initialises a serial line which may be used for a system console. It then allocates memory space (an operating system environment) for each operating system in turn, starting with the critical operating system. The hardware resource dispatcher therefore acts as a second level system kernel boot loader.

Each operating system kernel then goes through its own initialization phase (4062, 4064), selecting the resources to be exclusive to that operating system within those remaining in the resource allocation table 404, and starting its initial services and applications.

Figure 6:
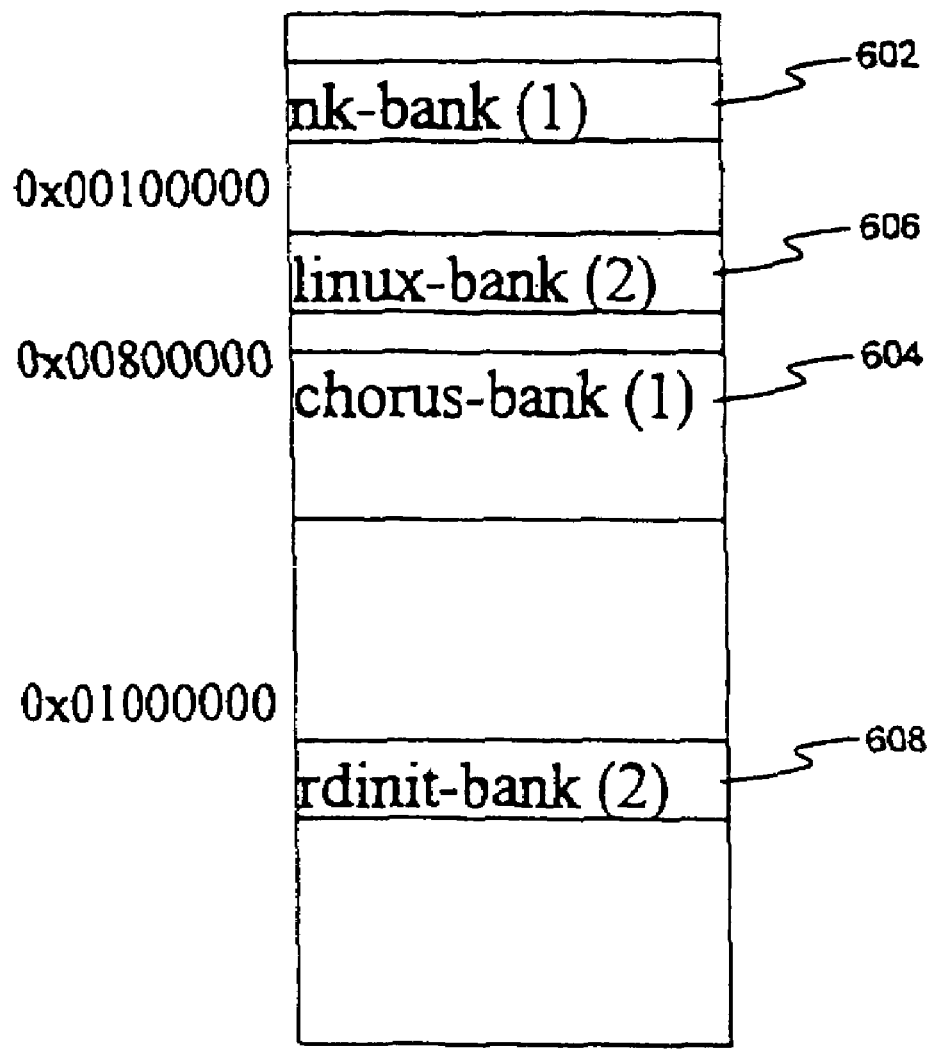
FIG. 6 illustrates the system memory image used in the boot or initialisation process.

FIG. 6 illustrates an example of a memory address allocation forming the system image. A position within memory is allocated when the hardware resource dispatcher and operating systems are compiled. The set of these positions in memory defines the system image, shown in FIG. 6. The system image comprises a first bank of memory 602 where the hardware resource dispatcher is located; a second bank of memory 604 where the real time operating system is located; a third bank of memory 606 where the secondary operating system is located; and, in this embodiment, a fourth bank of memory 608 where the RAM disk containing a root file system of the secondary operating system (Linux) is located.

This system image is stored in persistent storage (e.g. read only memory for a typical real time device such as a mobile telephone or PBX). The remaining banks of memory are available to be allocated to each operating system as its environment, within which it can load and run applications.

Allocation of Memory for Operating System Context

Whilst being booted, each operating system then allocates a complementary piece of memory in order to meet the total size required by its own configuration. Once allocated to an operating system, banks of memory are managed using the physical memory management scheme of the operating system itself. All other memory is ignored by the operating system.

Virtual Memory Allocation

Figure 3:
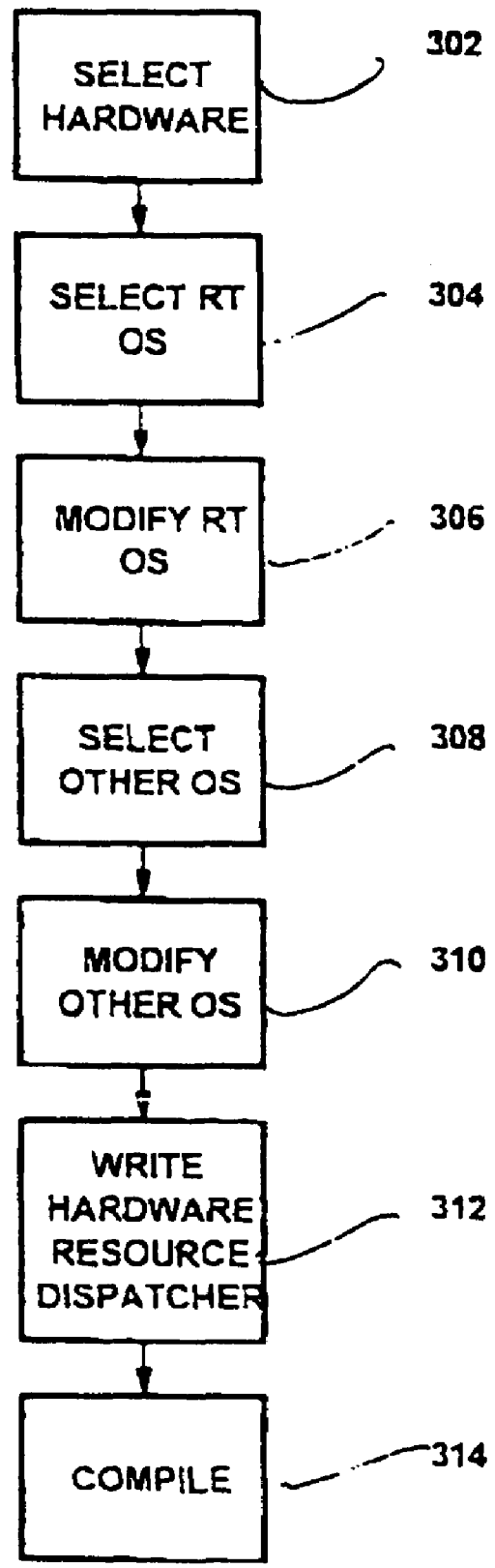
FIG. 3 is a flow diagram showing the stages in creating the software of FIG. 2b for the computer of FIG. 1.

Each operating system is allocated separate virtual memory spaces, to make sure that operating systems cannot interfere with each other or with the hardware resource dispatcher. The User address spaces (i.e. ranges) and Supervisor address space (i.e. range) of each of the operating systems is each allocated a different memory management unit (MMU) context identifier (ID), which allow the differentiation of different virtual memory spaces having overlapping addresses. The MMUs context IDs are assigned to each operating system at the time it is compiled (step 314 of FIG. 3).

This solution avoids the need to flush translation cashes (TLBs) when the hardware resource dispatcher switches between different operating systems, which would take additional time. Instead, the switch over between different operating systems is accomplished by storing the MMU context IDs of the currently function operating system, and recalling the previously stored MMU context IDs of the switched two operating system.

Allocation of Input/Output Devices

As indicated above, the allocation table 404 indicates which devices are allocated uniquely to each operating system. In addition, table 404 indicates which input/output resources (Direct Memory Access (DMA) devices, input/output ports, interrupts and so on) are allocated exclusively to such devices, thus allowing a direct use of these resources without any conflict. Typically, many devices are duplicated, so it is possible to reduce potential conflicts substantially in this way.

The distribution is based on the operating system configuration scheme (for example, in the case of C5, the devices specified in the device tree). They are allocated to operating systems at boot time, and in order of booting, so that the critical operating system has first choice of the available devices in the table 404 and the secondary operating systems in turn receive their allocation in what remains. As each operating system initialised, it detects the presence of these devices and uses its native drivers for them without interaction from the hardware resource dispatcher.

"Hot" Reboot of Secondary Operating System

According to the present embodiments, it is possible to reboot a secondary operating system (for example because of a crash) whilst other operating systems continue to run. Because of the separation of system resources, a crash in the secondary operating system does not interfere with the ongoing operation of the critical operating system (or other secondary operating systems) and the rebooting of that secondary operating system does not do so either.

In the embodiment, the system "stop" and "start" trap calls to the hardware resource dispatcher assist in shutting down and restarting the secondary operating systems from within the critical operating system. Additionally, the hardware resource dispatcher saves a copy of the original system image, at boot time, in persistent memory within the hardware resource dispatcher allocated memory. As an example, hot restart in this embodiment is managed as follows:

At the time of initially booting up, the hardware resource dispatcher saves a copy of the secondary operating systems memory image.

The critical operating system includes a software watchdog driver routine for periodically monitoring the functioning of the secondary operating systems (for example, by setting a timeout and waiting for an event triggered by a peer driver running in the secondary operating systems so as to check for their continued operation).

If the critical operating system detects that the secondary operating system has failed or stopped, it triggers "stop" and then "start" trap calls (of the secondary operating system) to the hardware resource dispatcher.

The hardware resource dispatcher then restores the saved copy of the secondary operating system image, and reboots it from memory to restart. It was found that, on tests of an embodiment, the Linux secondary operating system could be rebooted within a few seconds from locking up. In other respects, the hot restart builds upon that available in the Chorus operating system, as described for example in:

"Fast Error Recovery in CHORUS/OS. The Hot-Restart Technology". Abrossimov, F. Hermann, J. C. Hugly, et al, Chorus Systems Inc. Technical Report, August 1996, 14p. available from Jaluna.

jaluna.com/developer/papers/CSI-TR-96-34

Run-time Operation

The operation of the embodiment after installation and booting will now be described in greater detail.

Having been booted and initialized, the real time operating system is running one or more applications 207a, 207b (for example a UDP/IP stack—UDP/IP stands for Universal Datagram Protocol/Internet Protocol) and the secondary operating system is running several applications 208a, 208b (for example a word processor and a spreadsheet). The real time operating system microkernel 201 and the secondary operating system kernel 202 communicate with the hardware resource dispatcher through the hardware resource dispatcher interface which comprises:

a data structure representing the operating system context (i.e. the set of state variables which need to be saved and restored in order to switch to the operating system), and the hardware repository;

the set of functions which execute in the operating system environment; and the set of trap call routines which execute in the hardware resource dispatcher environment.

If neither operating system requires processor time (for example, both have reached "wait" states) then the hardware resource dispatcher 400 switches to the critical operating system's idle thread, in which it waits an interrupt or event. Thus, interrupts can be processed immediately by the critical operating system's servicing routines, without needing to switch to the critical operating system first.

At some point, an interrupt or event will occur. For example, a packet may be received at a data port, causing an interrupt to allow it to be processed by the real time operating system executing the UDP/IP stack. Alternatively, a user may manipulate a keyboard or mouse, causing an interrupt to operate the GUI of the second operating system 202 for interaction with the word processing application 208. Alternatively, the system clock may indicate that a predetermined time has elapsed, and that an application should commence re-execution, or an operating system function should execute.

The critical operating system servicing routine then services the interrupt, as described below.

Interrupt and Event Handling

If not already in the critical operating system, the hardware resource dispatcher interrupt handler 412 calls the operating system switcher 408 to switch to the critical operating system, and then the interrupt handler routine 412 to call an interrupt service routine (ISR) in the critical operating system 201. If the interrupt is intended for the critical operating system, either because it is from a device uniquely assigned to the critical operating system or because it is from a shared device and has a certain predetermined value, the critical operating system ISR takes the action necessary to handle the interrupt. If not, control is passed back to the hardware resource dispatcher.

Critical to Secondary Operating Systems Switch

Figure 2B:
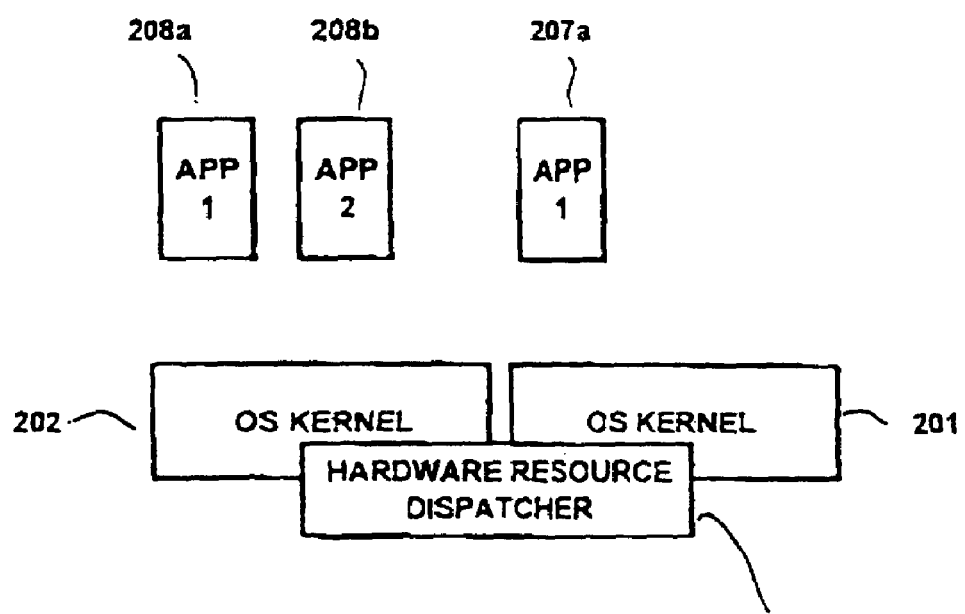
FIG. 2b is the corresponding diagram illustrating the arrangement of software according to the present embodiment.
Figure 7:
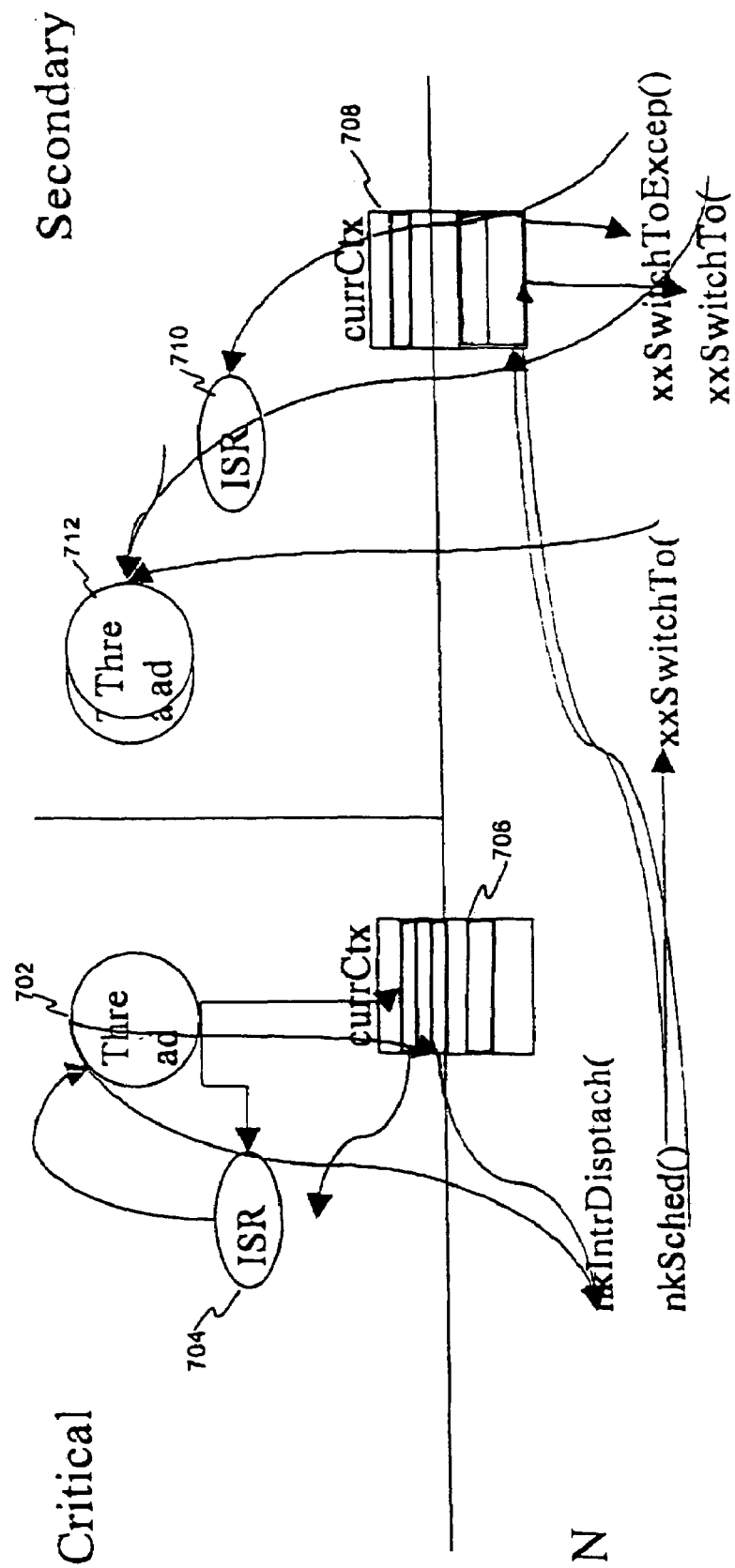
FIG. 7 illustrates the transition from a primary operating system to a secondary operating system.

Referring to FIG. 7, for this example, the system is executing a thread 702 of an application 207a (FIGS. 2b and 9a-b) running on the critical operating system 201.

If an interrupt occurs, a critical operating system interrupt service routine 704 performs interrupt servicing. On termination, control passes back to the thread 702 and any others executed by the scheduler of the critical operating system 201. When processing of all threads is complete, the critical operating system has finished executing, it schedules its "idle" thread. Accordingly the "idle" trap routine in the critical operating system issues an "idle" trap call to the hardware resource dispatcher 400. The hardware resource dispatcher then executes a routine which does the following:

If the interrupt handler 412 currently has some stored virtual interrupts, these are forwarded by the interrupt handler 412 to the secondary operating system.

The hardware resource dispatcher operating system scheduler 410 selects the secondary operating system 202 to execute. The OS switcher 408 then saves the current context (typically, processor MMU and status registers, instruction and stack pointers) in the critical OS context storage area 706. It then retrieves the stored execution context 708 for the secondary operating system 202, and writes them to the registers concerned.

If there are virtual interrupts for the secondary OS concerned, the interrupt handler 412 calls the relevant interrupt service routine 710 within the secondary operating system, which services the interrupt and then, on completion, reverts to the execution of a thread 712 of the secondary operating system where it left off.

If the interrupt handler 412 currently has no pending interrupts, then the hardware resource dispatcher operating switcher 408 causes the secondary operating system to recommence execution where it left off, using the stored program counter value within the restored operating system context, in this case at the thread 712.

Thus, after the critical operating system 201 has performed some function (either servicing its own applications or services, or servicing an interrupt intended for another operating system), the hardware resource dispatcher passes control back to the next secondary operating system 202, as determined by the scheduler 410.

Secondary to Critical Operating System Switch on Interrupt

Figure 8:
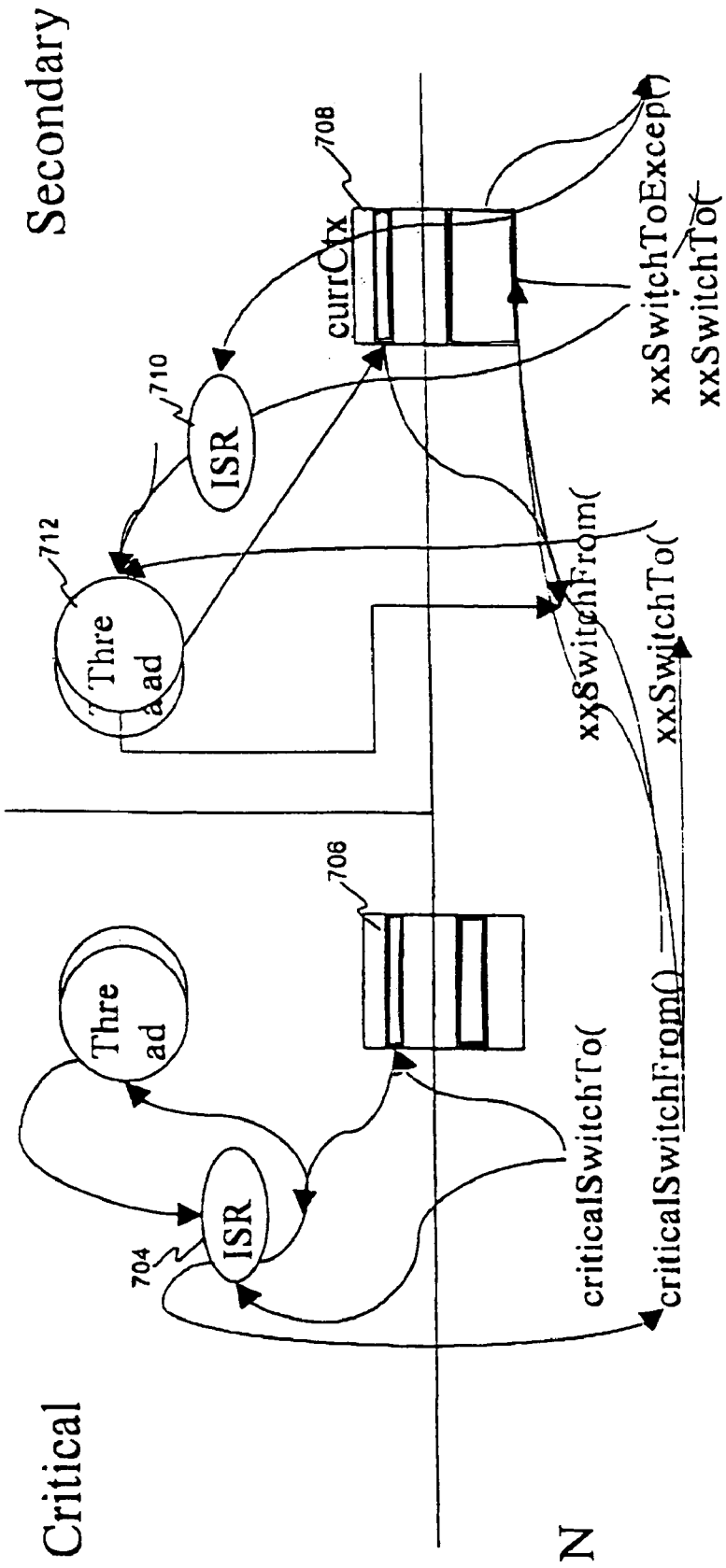
FIG. 8 illustrates the transition from a secondary operating system to a primary operating system.

Referring to FIG. 8, the process of transferring from the secondary operating system to the critical operating system will now be disclosed. In this case, the system is executing a thread 712 of an application 208a running on the critical operating system 202.

When a hardware interrupt occurs, the hardware resource dispatcher starts the OS switcher, to save the secondary operating system context in the context storage area 708. It then switches to the primary operating system 201, restoring the values of state variables from the context storage area 706, and calls the interrupt service routine 704 of the primary operating system 201. After servicing the interrupt, the scheduler of the primary operating system 201 may pass control back from the ISR 704 to any thread 704 which was previously executing (or thread to be executed).

When the ISR and all threads are processed, the primary operating system 201 passes control back to the hardware resource dispatcher, which switches from the primary operating system 201 (saving the state variables in the context storage 706) and switches to a selected secondary operating system 201 (retrieving the state variables from the context storage 708), in the manner discussed with reference to FIG. 7 above.

Inter-operating System Communications—Virtual Bus 418

The virtual bus routine cooperates with the virtual bus drivers in each operating system. It emulates a physical bus connecting the operating systems, similar to Compact PCI (cPCI) boards plugged into a cPCI backplane. Each operating system is provided with a driver routine for the virtual bus bridge device on this virtual bus, allowing the operating systems and their applications to communicate by any desired protocol, from raw data transfer to a full IP protocol stack.

The hardware resource dispatcher virtual bus is based on shared memory and system cross interrupts principles already discussed above. In detail, the virtual bus routine 418 emulates the C5 buscom DDI: syscom which defines virtual bus bridge shared devices, allowing the export (sharing) of memory across the virtual bus and triggering of cross-interrupts into other operating systems.

Each virtual bus driver, in each secondary operating system, creates such a virtual bus bridge in the hardware resource dispatcher hardware repository at startup time. By doing so, it exports (shares) a region of its private memory, and provides a way to raise interrupts within its hosting system.

Thus, a virtual bus driver of a first operating system sends data to a second operating system by:

writing into the memory exported by a peer virtual bus driver of the second operating system, and then;

triggering a cross-interrupt to notify that data are available to the peer bus driver in the second operating system.

In the reverse (incoming) direction, the virtual bus driver propagates incoming data up-stream (for use by the application or routine for which it is intended) when receiving a cross-interrupt indicating that such data have been stored in its own exported memory region.

Figure 9A:
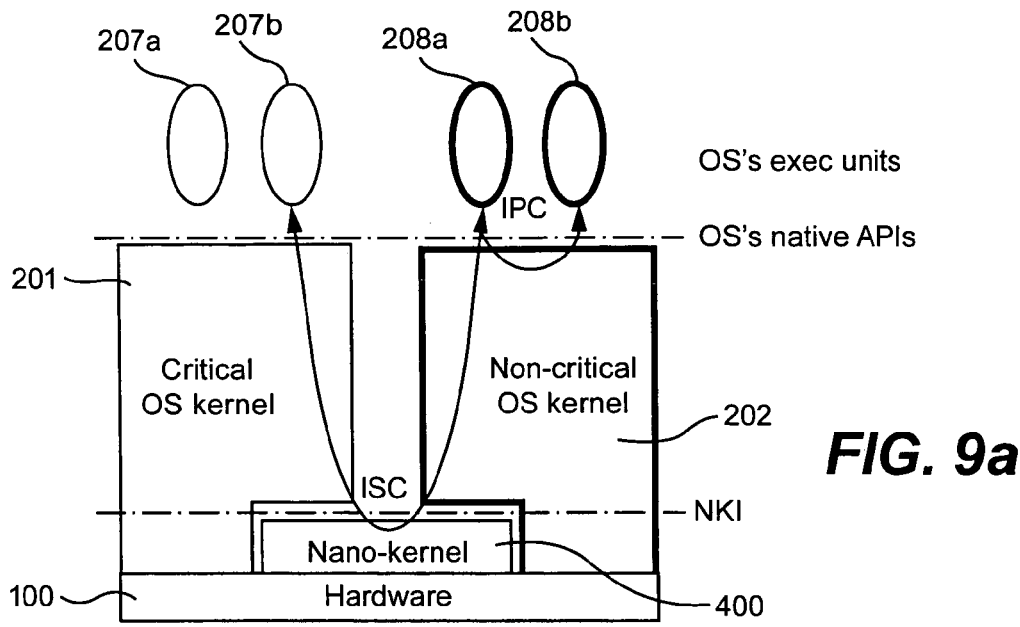
FIG. 9a illustrates the communication between applications running on different operating systems according to the invention.

Referring to FIG. 9a, an application 208a which is to communicate with another 208b running on the same operating system 202 can do so through that operating system. An application 207b running on one operating system 201 which is to communicate with another 208b running on a different operating system 202 does so by writing data to the virtual bus using the API of its operating system, which uses the virtual bus driver routine to pass the data to the other operating system 202, which propagates it from its virtual bus driver to the application 208b.

Figure 9B:
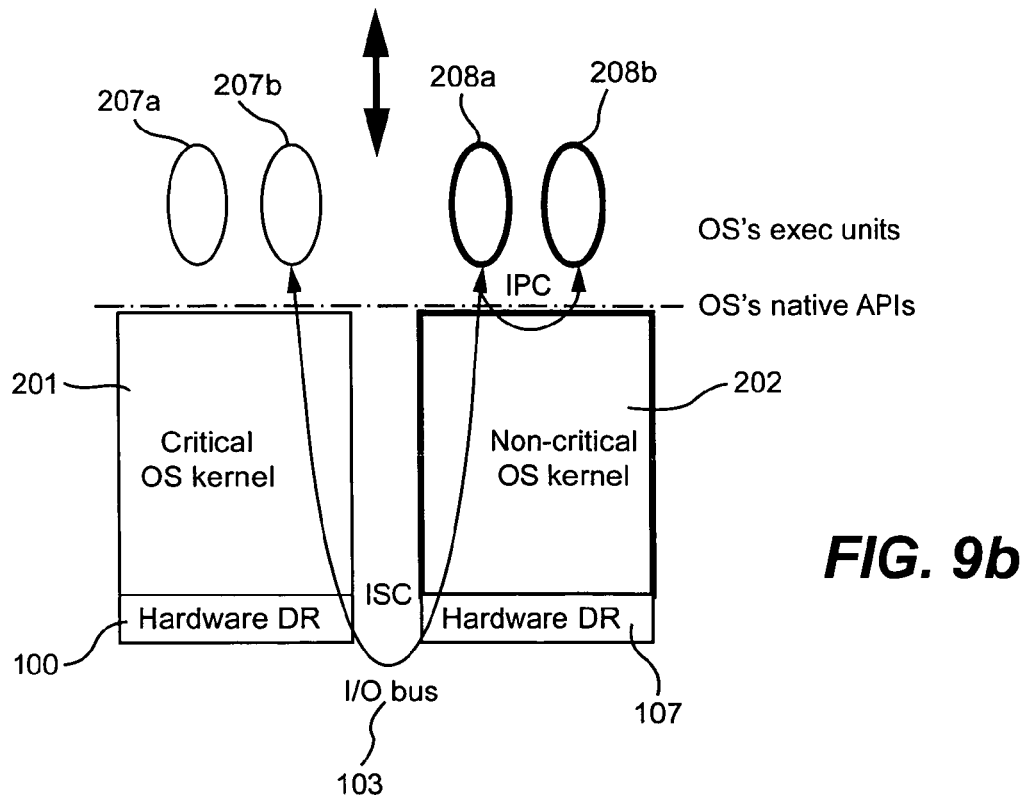
FIG. 9b illustrates the communication between applications running on different operating systems on different computers according to the invention.

Referring to FIG. 9b, the changes necessary to migrate this arrangement to one in which the first and second operating systems run on different computers 100, 107 are small; it is merely necessary to change the drivers used by the operating systems, so that they use drivers for a real bus 103 rather than the virtual bus drivers. The system is therefore made more independent of the hardware on which it operates.

Communication across the hardware resource dispatcher virtual bus is available to applications, but can also be used internally by the operating system kernels, so that they can cooperate in the implementation of services distributed among multiple operating systems. "Smart" distributed services of this kind include software watchdog used for system hot restart (discussed above), or a distributed network protocol stack.

Debugging

In a preferred embodiment, the hardware resource dispatcher has a second mode of operation, in which it acts as a debugging agent.

According to this embodiment, in the second mode, the hardware resource dispatcher can communicate via a serial communications line with debugging software tools running on another machine (the "host" machine).

Such debugging tools provide a high level graphical user interface (GUI) to remotely control the hardware resource dispatcher. The hardware resource dispatcher virtualised exception mechanism is used to intercept defined exceptions. The user can then configure and control how the hardware resource dispatcher behaves in case of processor exceptions, and also display machine and system states, to enable diagnosis of code or other system errors or problems.

The user can select one or more such processor exceptions as the basis for a trap call from an operating system to the hardware resource dispatcher. On the basis of the selected exception, when the or each exception occurs during execution, the operating system is stopped, and executes the trap call to the hardware resource dispatcher, which then saves the current context and enables interaction with the debugging tools on the host. The user can then cause the display of the current states of the state variables (such as the stack pointers, program and address counters) and/or the content of selected block of memory. The user can specify either that a given type of exception should be trapped in a specific operating system to be debugged, or that they should be trapped whenever they occur, in any operating system. In response, the trap call is implemented in just one, or in all, operating systems. The user can also specify if a given type of exception is to be normally forwarded to the system when restarting execution or simply ignored.

Because the hardware resource dispatcher executes in its own environment, it is able to debug much more of an operating system than could be done from within that system. Importantly, no code is shared between the hardware resource dispatcher acting as a debug agent and the sytems being debugged. This allows, for example, the debugging of even kernel low level code such as exception vectors or interrupt service routines.

Some other aspects of the overall (host/target) debugging architecture according to this embodiment are similar to those for the Chorus and C5 debugging systems, described in the document "C5 1.0 Debugging Guide" published by Jaluna, and available at:

jaluna.com/doc/c5/html/DebugGuide/book1

Secure Architecture

It will be clear that the embodiments described above give a firm basis for a secure architecture. This is because the secondary operating system, on which a user will typically run insecure applications, is insulated from specified system resources, and accesses them only through the hardware resource despatcher (and the drivers of the primary operating system). Thus, security applications can be run on the primary operating system which, for example, perform encryption/decryption; allow access to encrypted files; manage, store and supply passwords and other access information; manage and log access and reproduction of copyright material. Applications running on the secondary operating system cannot access system resources which are not allocated to that operating system, and where the operating systems run in different memory contexts (i.e. use different addressing pointers to different spaces) applications running on the secondary operating system cannot be used to interfere with those operating on the primary system so as to weaken the security of its operations.

OTHER ASPECTS AND EMBODIMENTS

It will be clear from the forgoing that the above-described embodiments are only examples, and that many other embodiments are possible. The operating systems, platforms and programming techniques mentioned may all be freely varied. Any other modifications, substitutions and variants which would be apparent to the skilled person are to be considered within the scope of the invention, whether or not covered by the claims which follow. For the avoidance of doubt, protection is sought for any and all novel subject matter and combinations thereof disclosed herein.

What is claimed is:

1. A method of enabling multiple different operating systems to run concurrently on the same computer, comprising:
   selecting a first operating system to have a relatively high priority;
   selecting at least one second operating system to have a relatively lower priority;
   providing a common program arranged to switch between and control said operating systems;
   wherein the common program is arranged to pass interrupts intended for the first and second operating systems to the first operating system,
   and in that the first operating system is arranged to process interrupts intended for the first operating system, and to pass interrupts intended for the second operating system back to the common program for forwarding to the second operating system.

2. The method of claim 1, in which the first operating system is a real time operating system.

3. The method of claim 1, in which the second operating system is a non-real time, general-purpose operating system.

4. The method of claim 1, in which the second operating system is Linux, or a variant thereof.

5. The method of claim 1, in which the common program is arranged to save, and to restore from a saved version, the processor state required to switch between the operating systems.

6. The method of claim 1, in which processor exceptions for the second operating system are handled in virtual fashion by the common program.

7. The method of claim 1, in which the common program is arranged to intercept some processor exceptions, and to call exception handling routines of the first operating system to service said processor exceptions.

8. The method of claim 7, in which the processor exceptions for the second operating system are notified as virtual exceptions.

9. The method of claim 8, in which the common program is arranged to call an exception handling routine of the second operating system corresponding to a said virtual exception which is pending.

10. The method of claim 1, further comprising providing each of said operating systems with separate memory spaces in which each can exclusively operate.

11. The method of claim 1, further comprising providing each of said operating systems with first input and/or output devices of said computer to which each has exclusive access.

12. The method of claim 11, in which each operating system accesses said first input and/or output devices using substantially unmodified native routines.

13. The method of claim 1, further comprising providing each of said operating systems with access to second input and/or output devices of said computer to which each has shared access.

14. The method of claim 13, in which all operating systems access said second input and/or output devices using the routines of the first operating system.

15. The method of claim 1, further comprising providing a restart routine for restarting a said second operating systems without interrupting operation of said first, or said common program.

16. The method of claim 15, in which the common program provides trap call mechanisms, to control the operation of the second operation system, and/or event mechanisms to notify the first operating system of status changes in the second operation system.

17. The method of claim 15, in which the common program stores a copy of the system image of the kernel of the second operating system, and is arranged to restore the kernel of the second operating system from such a saved copy.

18. The method of claim 15, in which the first and second operating systems have cooperating routines to enable the first operating system to monitor the continued operation of the second operating system, to allow the detection of a crash of the second operating system.

19. The method of claim 1, further comprising providing a debug routine, in which the common program is arranged to output the states of machine state variables on occurrence of predefined conditions in the operation of said operating systems.

20. The method of claim 1, further comprising combining said operating systems and common program into a single code product.

21. The method of claim 1, further comprising embedding said operating systems and common program onto persistent memory on a computer product.

22. The method of claim 1, in which the common program is arranged to provide an inter-operating system communications mechanism allowing communications between said first and second operating systems, and/or applications running on said first and second operating systems.

23. The method of claim 22, in which the common program defines virtual input and/or output devices corresponding to communications bus bridges, so that said operating systems can communicate as if by a communications bus.

24. The method of claim 23, in which the step of modifying said operating systems comprises adding driver routines managing said virtual bus bridge devices.

25. The method of claim 1, in which each said operating system is provided with an idle routine, in which it passes control to the common program.

26. The method of claim 25, in which said idle routine substitutes for a processor halt instruction.

27. A development kit computer program product stored in a memory comprising codes executing by a computer that perform a method comprising:
 selecting a first operating system to have a relatively high priority;
 selecting at least one second operating system to have a relatively lower priority;
 providing a common program arranged to switch between and control said operating systems;
 wherein the common program is arranged to pass interrupts intended for the first and second operating systems to the first operating system,
 and in that the first operating system is arranged to process interrupts intended for the first operating system, and to pass interrupts intended for the second operating system back to the common program for forwarding to the second operating system.

28. The computer program product of claim 27 comprising said operating systems and common program combined into a single program code product.

29. An embedded computer system comprising a CPU, memory devices and input/output devices, having stored on persistent memory therein operating systems and common programs for performing a method comprising:
 selecting a first operating system to have a relatively high priority;
 selecting at least one second operating system to have a relatively lower priority;
 providing a common program arranged to switch between and control said operating systems;
 wherein the common program is arranged to pass interrupts intended for the first and second operating systems to the first operating system,
 and in that the first operating system is arranged to process interrupts intended for the first operating system, and to pass interrupts intended for the second operating system back to the common program for forwarding to the second operating system.

30. A computer system comprising a CPU, memory devices and input/output devices, having executing thereon computer code comprising:
 a first operating system having a relatively high priority;
 a second operating system having a relatively lower priority; and
 a common program arranged to run said operating systems concurrently by switching between said operating systems,
 wherein the common program is arranged to pass interrupts intended for the first and second operating systems to the first operating system,
 and wherein the first operating system is arranged to process interrupts intended for the first operating system, and to pass interrupts intended for the second operating system back to the common program for forwarding to the second operating system.

31. A computer system according to claim 30, arranged to run said first and second operating systems, concurrently using the method of enabling multiple different operating systems to run concurrently on the same computer, comprising:

selecting a first operating system to have a relatively high priority;

selecting at least one second operating system to have a relatively lower priority;

providing a common program arranged to switch between said operating systems under predetermined conditions; and providing modifications to said first and second operating systems to allow them to be controlled by said common program.

* * * * *